United States Patent
Thanumalayan et al.

(10) Patent No.: US 8,613,007 B2
(45) Date of Patent: Dec. 17, 2013

(54) SERVER INDEPENDENT DEPLOYMENT OF PLUG-INS

(75) Inventors: Reghu Ram Thanumalayan, Nussloch (DE); Indresh Ms, Karnataka (IN)

(73) Assignee: Business Objects Software Limited, Dublin (IE)

(*) Notice: Subject to any disclaimer, the term of this patent is extended or adjusted under 35 U.S.C. 154(b) by 577 days.

(21) Appl. No.: 12/893,215

(22) Filed: Sep. 29, 2010

(65) Prior Publication Data
US 2012/0079383 A1    Mar. 29, 2012

(51) Int. Cl.
G06F 3/00    (2006.01)
G06F 3/14    (2006.01)

(52) U.S. Cl.
USPC .................. 719/332; 719/328; 715/764

(58) Field of Classification Search
None
See application file for complete search history.

(56) References Cited

U.S. PATENT DOCUMENTS

| | | | |
|---|---|---|---|
| 2002/0143705 A1* | 10/2002 | Kaars | 705/51 |
| 2009/0292980 A1* | 11/2009 | Swineford et al. | 715/202 |
| 2011/0022984 A1* | 1/2011 | van der Meulen et al. | 715/830 |
| 2011/0113350 A1* | 5/2011 | Carlos | 715/753 |

OTHER PUBLICATIONS

"Contribute to Eclipse", Kent Beck, 2002, pp. 1-93.*
"COMP: Comparing Ontology Matching Plug-in", Pavel Tyl, pp. 1-6.*

* cited by examiner

*Primary Examiner* — Tuan Dao

(57) ABSTRACT

Disclosed are methods and systems for deploying one or more plug-ins. The method and systems involve receiving a request for generating a graphical user interface at a client computing device, the request includes a configuration for flash content of the graphical user interface, identifying a one or more plug-ins associated with the request and at least one extension of the identified one or more plug-ins, the one or more plug-ins having been deployed at a plurality of content servers across plurality of platform types and stored in a plug-in repository, retrieving the identified one or more plug-ins based on the extension of the identified one or more plug-ins and generating the requested graphical user interface based on the retrieved one or more plug-ins.

16 Claims, 6 Drawing Sheets

SERVER INDEPENDENT DEPLOYMENT OF PLUG-INS

FIELD

The field generally relates to deploying plug-ins and more specifically to deploying server independent plug-ins.

BACKGROUND

A Flex package is a user interface application component implemented with the Adobe Flex® technology. The flex technology, used to build user interfaces, includes code and metadata about the components and assets. The user interfaces built by the flex technology are different from the general user interfaces since they typically provide a richer user experience. The user interface applications are built as a package and they are shipped to the customer. Once the package is shipped to the customer, they have to be regularly updated. To update the existing package, a new package along with the latest updates has to be re-complied at run time. Further, if the packages are developed on multiple server platforms, the updates of the package are deployed on the corresponding server platforms.

Currently available systems provide a standard deployment mechanism for Flex components through a folder path accessible from the web root folder or packaged as .WAR files deployed on a server container. This system is not flexible enough to support distributed deployment. The assembly of Flex components from different server platforms and running them in flash player runtime requires the availability of cross-domain policy files on the server root, which stipulate the access policy for the Flex components deployed in the server. There is a need for deploying the Flex components in a transparent way.

SUMMARY

Various embodiments of systems and methods for server independent deployment of plug-ins are described herein. The method and systems involve receiving a request for generating a graphical user interface at a client computing device, the request includes a configuration for flash content of the graphical user interface, identifying a one or more plug-ins associated with the request and at least one extension of the identified plug-ins. The one or more plug-ins are deployed at a plurality of content servers across a plurality of platform types and are stored in a plug-in repository. The identified one or more plug-ins are retrieved based on the extension of the one or more plug-ins and the requested graphical user interface is generated based on the retrieved one or more plug-ins. In one embodiment, the one or more plug-ins are retrieved according to plug-in identifiers.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Figure 1:
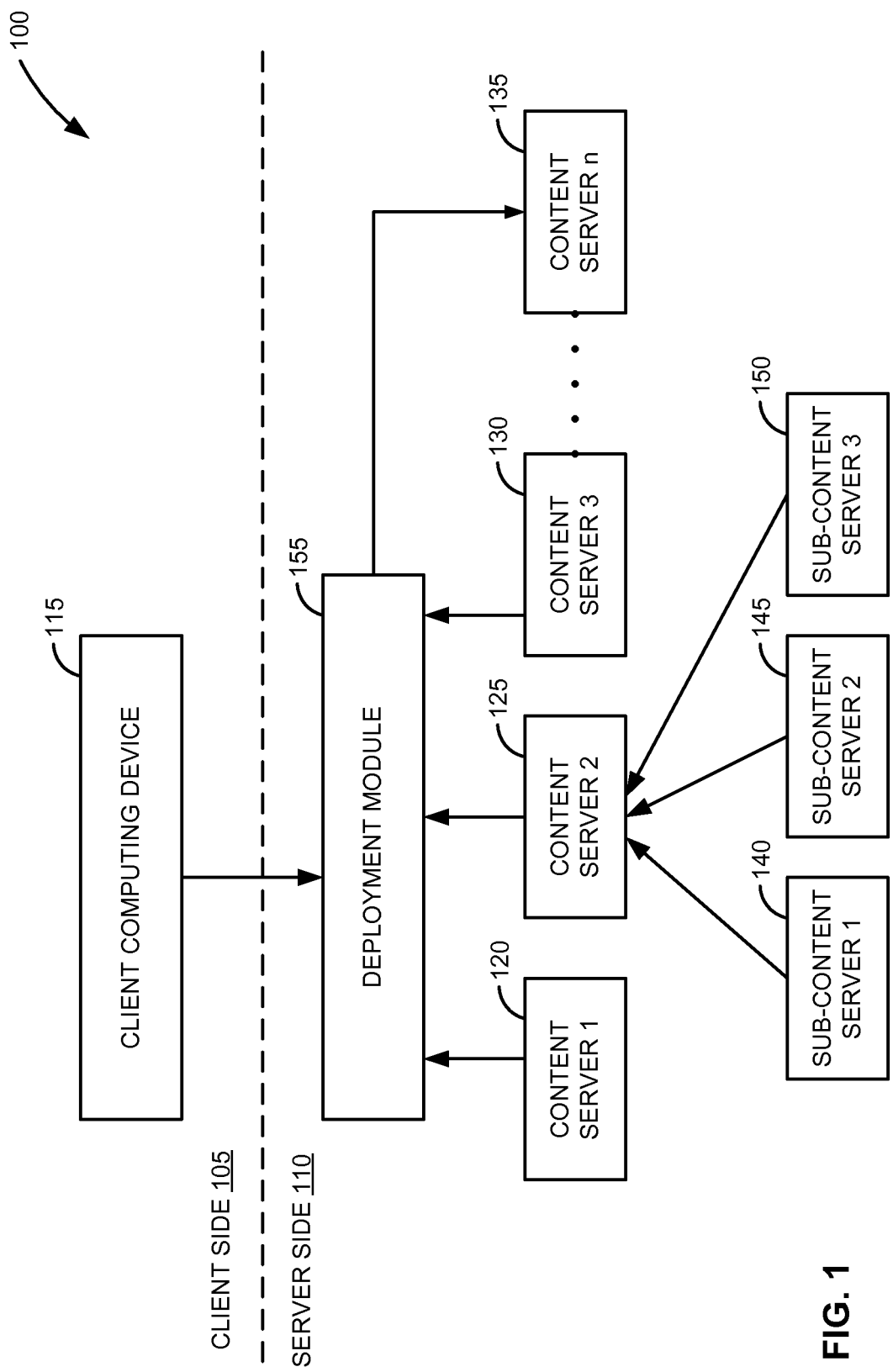
FIG. 1 is a block diagram illustrating an exemplary block diagram for deploying one or more plug-ins according to an embodiment.

Embodiments of techniques for server independent deployment of plug-ins are described herein. In the following description, numerous specific details are set forth to provide a thorough understanding of various embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

The Flex Client Platform (FCP) is a module system for building rich internet applications. The rich internet applications are built on top of Flex™ or Flash technology. The FCP will be available for one or more server platforms. The FCP client is based on a modular architecture which allows extension of underlying framework and capabilities. The FCP defines extension points. Extension points provide a first application designed to be incorporated into a second application in order to enhance, or extend, the functionalities of the second application. The architecture also supports flexible deployment of additional components during runtime without the need to recompile the application.

FCP includes two components namely FCP client and FCP server. The FCP client loads the plug-ins at runtime, starts the plug-ins and connects the extension point offered by the first plug-ins with the extensions offered by the second plug-ins. FCP server includes multiple servers on various platforms. The multiple servers enable incremental deployment of the plug-ins. The multiple server platforms may include but are not restricted to Java, ABAP, .Net, C, C++ and so on.

The FCP server includes a plurality of content servers on which the plug-ins are deployed. The plug-ins may be deployed on different server platforms. The plug-ins may be developed by the flex technology. Consider a business scenario of three teams A, B and C developing plug-ins. The teams develop plug-ins independently across plurality of content servers. Team A develops plug-in P1, Team B develops P2, and Team C develops P3. Plug-in P2 is a reusable plug-in. The plug-ins are deployed by the plug-in manager. The plug-ins are registered in the plug-in registry. The plug-in registry includes the plug-in identifiers and the details about the content servers on which the plug-ins are deployed. The plug-in registry registers the extension points offered by the plug-ins.

In one embodiment, the FCP server may include just in time configuration creator, application resource handler and scope management module. The just in time configuration creator enables the FCP client to start up the application. The application resource handler responds to the client request. The client request may include resource requests such as plug-in manifests, images, and so on.

The FCP client receives a user request for generating the GUI. The request includes configurations required for generating a flash content of the GUI. The configuration of the flash content may include but are not restricted to images, animations, video and interactive applications. The plug-ins associated with the request are identified. The identified plug-ins are retrieved from a plug-in repository based on the description provided by the plug-in in the plug-in registry. The identified plug-ins are checked for extensions. A suitable extension for the identified plug-in is searched. Both the extensions are linked to generate the requested user interface.

FIG. 1 is a block diagram illustrating an exemplary method for deploying one or more plug-ins according to an embodiment. Business scenario 100 includes a client computing device 115 on the client side 105, content server 1 120, content server 2 125, content server 3 130 to content server n 135 and deployment module 155 on the server side 110. The client computing device 115 receives a request from a user for generating a GUI. The user request includes receiving a configuration for generating a flash content of the GUI. The configuration of the flash content may include but is not restricted to images, animations, video and interactive applications. The user interface is a combination of one or more plug-ins, which results in the requested user interface. In one embodiment, the plug-ins may be deployed across one or more content servers. For instance, in the plug-ins may be deployed at the Java platform or an ABAP platform. The Java plug-in and the ABAP plug-in are deployed by a deployment module 155. In another embodiment, the deployment module may include a plug-in manager, a plug-in registry and a plug-in repository. The deployed plug-ins are stored from the content servers to the plug-in repository through a plug-in registry.

On receiving the user request, the plug-ins required to generate the requested GUI are identified. The plug-ins are identified through a plug-in manifest. The plug-in manifest provides functional description of the deployed plug-ins. Based on the description in the plug-in manifest, the plug-ins suitable for generating the GUI are retrieved from the plug-in repository. The GUI is generated based on the flash content provided by the retrieved plug-ins. For instance, the plug-in deployed in Java and the plug-in deployed in ABAP may be linked together to render a requested user interface.

According to one embodiment, the content server 2 125 is connected to three sub-content servers 140, 145 and 150. When the client computing device 115 makes a request for generating the flash content of the GUI, the plug-ins required for the generation of the GUI may have been deployed at the sub-content servers 140, 145 and 150. In another embodiment, though the plug-ins are deployed at one sub-content server (e.g., 140), the plug-ins may be served from the content server 2 125 as the sub content server 140 is connected to the content server 2 125.

In yet another embodiment, the plug-in manager redirects the http requests to the appropriate content server based on universal resource locator (URL) formats and special http headers. For instance, if the client computing device 115 makes a request for a image located on the content server 120 and if that image is moved to the another content server 130, the request for the image is redirected from content server 120 to content server 130.

Figure 2:
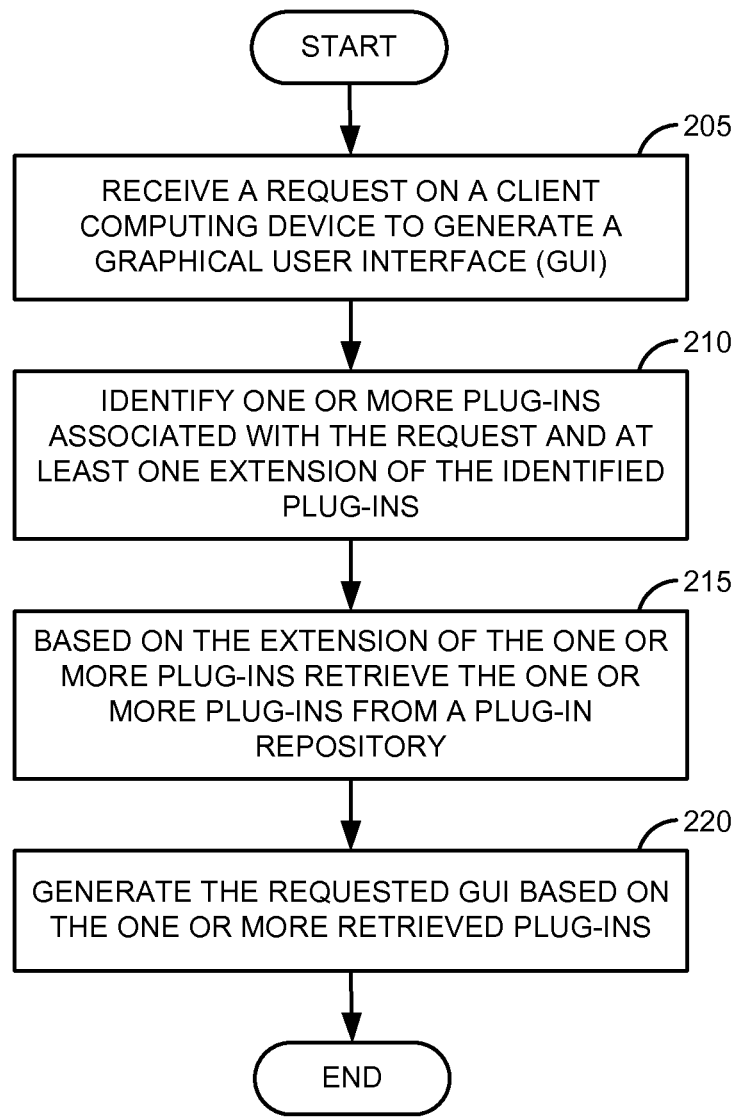
FIG. 2 is a flow diagram illustrating an exemplary method for generating a user interface by deploying plug-ins according to an embodiment.

FIG. 2 is a flow diagram illustrating an exemplary method for generating a GUI by deploying plug-ins according to an embodiment. A request to generate a GUI is received at process block 205. The request includes receiving a configuration for generating flash content of the GUI. The configuration of the flash content may include but is not restricted to images, animations, video and interactive applications. The GUI may be generated by a combination of one or more plug-ins. At process block 210, the plug-ins associated with the request and at least one extension of the identified plug-ins are identified. The extension of the plug-in defines the function offered by the plug-in. The functions offered by the plug-in are defined in a plug-in manifest. According to one embodiment, the plug-ins may have been deployed at one or more content servers across different server platforms. The plug-ins are deployed from the content servers and stored in the plug-in repository through a plug-in registry. The content servers may be but are not restricted to Java, J2EE, .Net, ABAP and so on. Similarly, the server platforms may be but are not restricted to Java, J2EE, .Net, ABAP and so on. At process block 215, the one or more plug-ins are retrieved from a plug-in repository based on the extension of the identified one or more plug-ins. Retrieving the identified plug-ins involve retrieving the plug-ins according to plug-in identifiers. The plug-ins are retrieved according to the plug-in identifiers. The entries of the plug-ins in the plug-in registry indicate the details about the content server on which the plug-ins were deployed. At process block 220, the GUI is generated based on the retrieved plug-ins. The GUI is generated and presented to the user. In one embodiment, the user interface is generated at a Flash Player® run time.

In another embodiment, the plug-ins are deployed incrementally. Deploying the plug-ins incrementally allows the one or more plug-ins to come in and go out of the platform independent of other plug-ins. In yet another embodiment, the plug-in registry indicates the link between the plug-ins. For instance, if application A includes plug-ins P1 and P2, the plug-in registry indicates that P1 and P2 are linked. If a user intends to download plug-in P1 the plug-in registry indicates he may also want to download P2.

Figure 3:
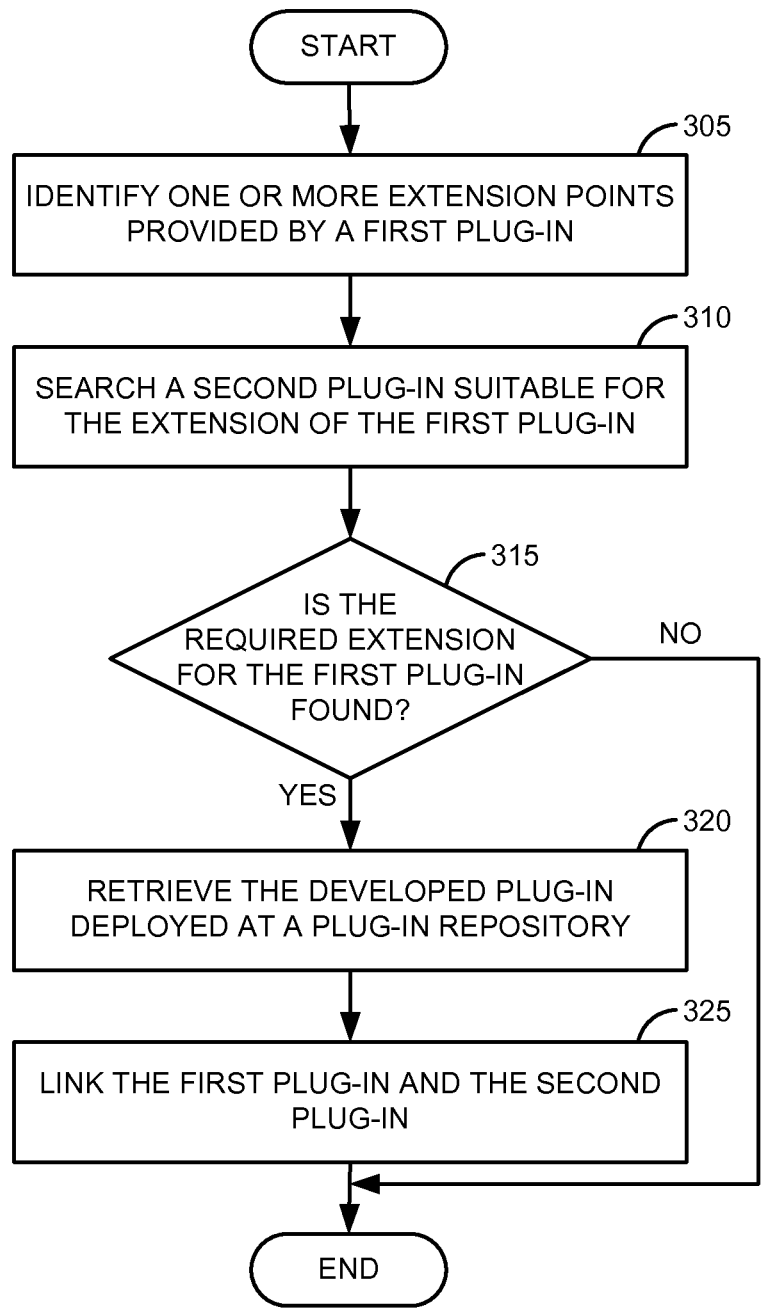
FIG. 3 is a flow diagram illustrating an exemplary method for identifying extensions of the plug-ins according to an embodiment.

FIG. 3 is a flow diagram illustrating an exemplary method for identifying extensions of the plug-ins according to an embodiment. At process block 305, extension point provided by a first plug-in is identified. Extension points provide a first application designed to be incorporated into a second application in order to enhance, or extend, the functionalities of the second application. At process block 310, a second plug-in suitable for the extension point of the first plug-in is searched. At decision block 315, it is checked if the required extension for the first plug-in is found. If the second plug-in is found, the process proceeds to process block 320 to retrieve the plug-ins deployed at the plug-in repository. At process block 325, the first plug-in and the second plug-in are linked. At decision block 315, if the target plug-in is not found, the process ends. In one embodiment, if the first plug-in offers more than one extension, the process explained above is repeated.

Consider an example of a language conversion user interface. The plug-ins associated with the language conversion user interface are identified. The functions of the identified plug-ins are declared in the plug-in manifest. A plug-in 'X' with function as understanding a language interface is offering an extension point. In this scenario, the extension point is "understanding language interface" which means that any other plug-in 'Y' providing a language tool such as converting English to German may be combined with the plug-in 'X'. The first plug-in 'X' and the second plug-in may be linked to render a language conversion user interface for converting English to German.

Consider another scenario where a language interface is shipped to a customer. For instance, the shipped language interface supports three languages English, French and German. Now an enhanced version of the language interface is available which supports two other new languages Spanish and Japanese. In this scenario, the shipped language interface is a first plug-in offering an extension point and the enhanced version of the language interface is a second plug-in which may be linked to the extension point provided by the first plug-in. Once the first plug-in and the second plug-in are linked the language interface offers five languages (i.e. English, French, German, Spanish and Japanese).

Figure 4:
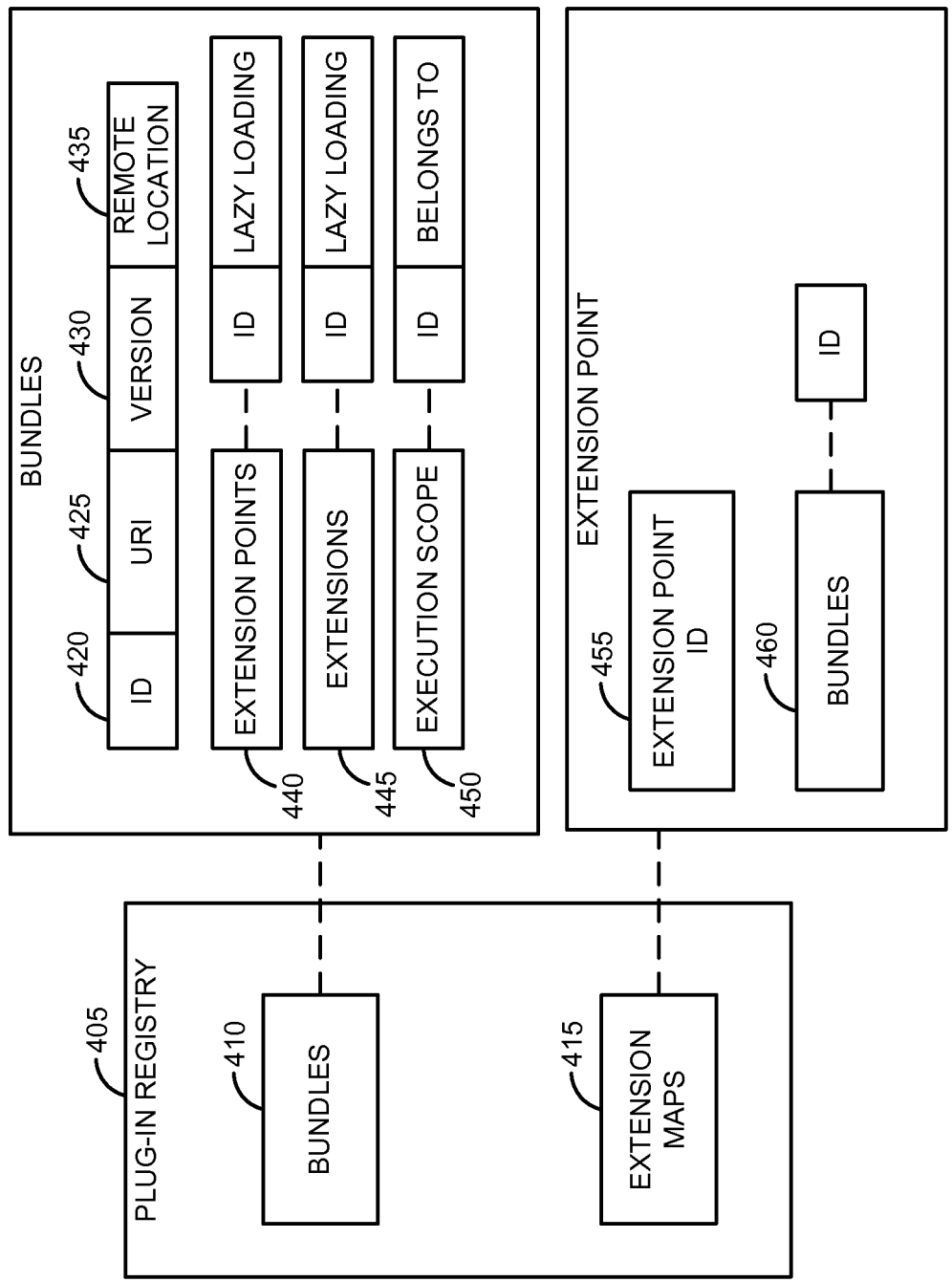
FIG. 4 is a block diagram of an exemplary plug-in registry according to an embodiment.

FIG. 4 is a block diagram of an exemplary plug-in registry according to an embodiment. The plug- in registry 405 includes bundles 410 and an extension map 415. In one embodiment, the bundle may be a plug-in. Once a plug-in is deployed from a content server, the plug-in registry 405 updates a identifier (ID) 420, universal resource identifier (URI) 425, version 430 and remote location 435 associated with the deployed plug-in in the bundle 410. The URI 425 is used to retrieve a plug-in from a remote server. The remote location 435 specifies the remote location of the server where the plug-in is deployed. The plug-in registry 405 also includes the extension points 440, extensions 445 and execution scope 450 associated with the plug-in. The extension points 440 provide a first application designed to be incorporated into a second application in order to enhance, or extend, the functionalities of the second application. Consider the language interface business scenario of language conversion user interface explained in FIG. 3. For this business scenario, the extension point of the plug-in specified in the extension point 440 may be "understanding language interface". The extension 445 offered to the extension point 440 may be "language tool converting English to German". In one embodiment, the extensions 445 may include the plug-ins which contribute to extension point 440 or another extension point on a different content server. In another embodiment, the bundles 410 enable a user to search extension points when an ID is entered, The ID may be a plug-in identifier. In another embodiment, the extension points 440 and extension 455 may define a plug-in to be lazy loaded. This criterion is defined by the 'lazy loading' associated with the plug-in identifiers. Lazy loading enables a plug-in in an application to be loaded at a later point of time based on a user selection.

The extension map 415 includes extension point id 455 and bundles 460. The bundles also include an ID. The extension map 415 enables a user to search for an extension when a extension point ID is entered.

In one embodiment, the plug-in registry 405 includes an execution scope 450. The execution scope 450 may categorize the view of an application into a basic view and an advanced view. For instance, if there are five plug-ins contributing to an application, the user may want to display two plug-ins in the basic view and five plug-ins in the advanced view. This criterion may be defined in the execution scope 450 according to the plug-in identifier. The 'belongs to section' associated with the execution scope 450 may include details about the type of view (e.g., basic view or advanced view).

Figure 5:
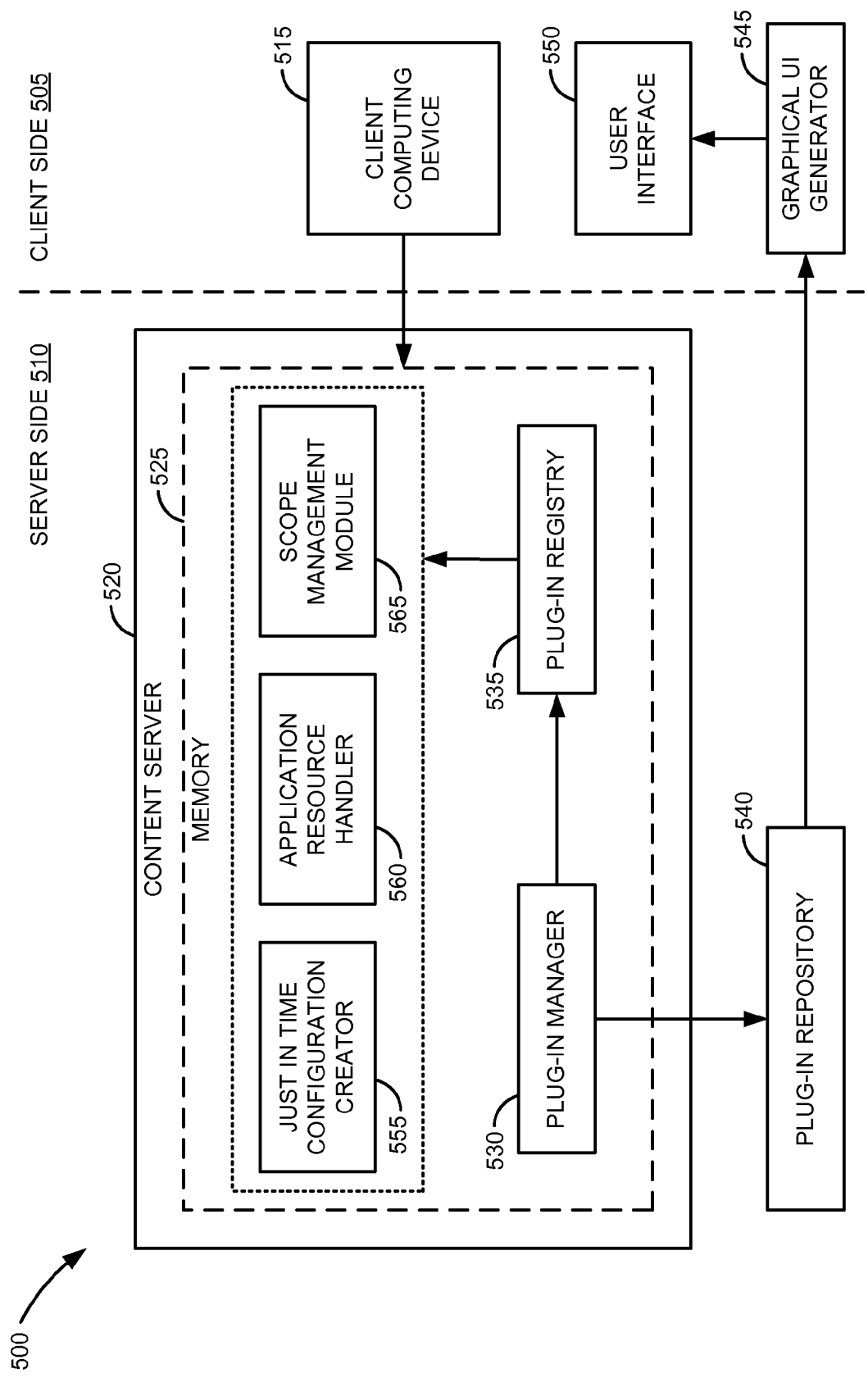
FIG. 5 is a block diagram of an exemplary system for deploying one or more plug-ins according to an embodiment.

FIG. 5 is a block diagram of an exemplary system for deploying one or more plug-ins according to an embodiment. The computer system 500 includes a client side 505 and a server side 510. The client side 505 includes a client computing device 515, a user interface (UI) 550 and a graphical UI generator 545. The server side 510 includes a content server 520 and plug-in repository 540. The memory 525 of the content server 520 includes a plug-in manager 530, plug-in registry 535, just in time configuration creator 555, application resource handler 560 and scope management module 565. The processor (not shown), in communication with the memory 525 includes instructions for the plug-in manager 530, the plug-in registry 535, just in time configuration creator 555, application resource handler 560 and scope management module 565 to perform the required operations.

The plug-ins are deployed at the content server 520. In one embodiment, the server side 510 includes several content servers. Several developers deploy the plug-ins at these content servers. The content servers may be of different server platform types. In one embodiment each of the content servers may maintain the plug-in registry and plug-in manager within its memory whereas the plug-in repository may be on another content server.

The plug-ins deployed at the content server 520 includes flash content required to generate the user interface 550. At design time, the plug-ins are deployed by the plug-in manager 530. The plug-ins are registered in the plug-in registry 535 according to their plug-in identifiers. The plug-in registry 535 also provides function associated with the plug-in. The plug-ins are stored in the plug-in repository 540.

The client computing device 515 receives a request from a user to generate a user interface 550. The user request includes the configuration required for the flash content generation associated with the user interface 550. The just in time configuration creator 455 supplies the configurations required by the client computing device 515 to generate the user interface. The just in time configuration creator 555 also helps in incremental and independent deployment of the plug-ins.

At runtime, the user request is forwarded to the application resource handler 560. The application resource handler 560 responds to the user request such as plug-in requests, image request, plug-in manifest request and so on. On receiving the request for generating the user interface 550, the plug-ins are retrieved from the plug-in repository 540 according to their plug-in identifiers and the user interface 550 is generated by the graphical UI generator 545. The generated user interface is presented on the user interface 550.

According to one embodiment, the scope management module 565 categorizes the plug-ins. According to another embodiment, categorizing the plug-ins involves arranging the plug-ins according to the security rights. The security rights may include but are not restricted to, providing access to the plug-ins with a user login and restricting access to the plug-ins without a user login.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
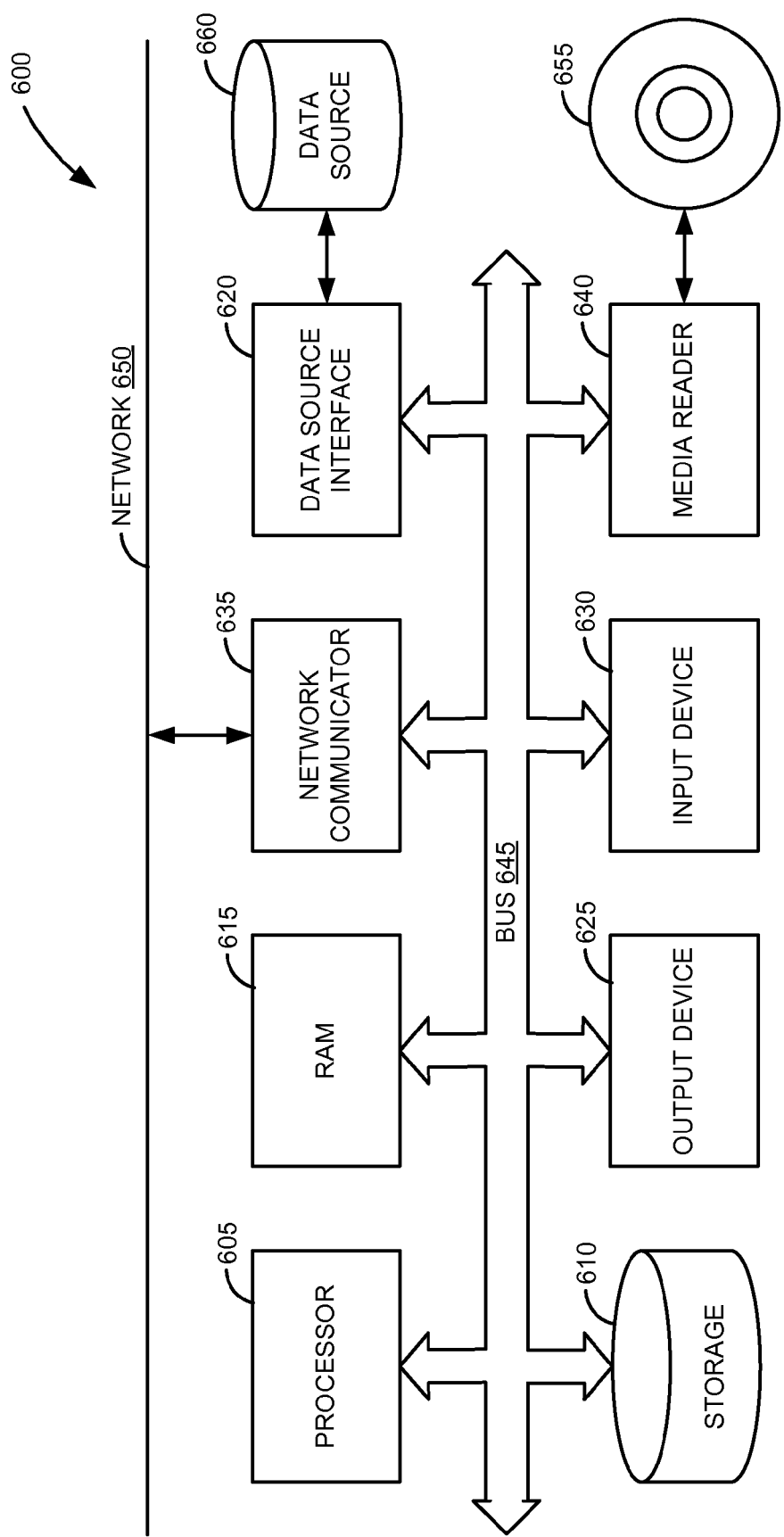
FIG. 6 is a block diagram of an exemplary computer system according an embodiment.

FIG. 6 is a block diagram of an exemplary computer system 600 according to an embodiment. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interacting with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however, that the invention can be practiced without one or more of the specific details or with other methods, components, techniques, etc. In other instances, well-known operations or structures are not shown or described in detail to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive a request to generate a graphical user interface including one or more plugs-ins at a client computing device, the request comprising a configuration for flash content of the graphical user interface;
   identify the one or more plug-ins based on one or more plug-in manifests associated with the one or more plug-ins, the one or more plug-ins deployed at a plurality of content servers of a plurality of platform types and stored in a plug-in repository;

identify at least one extension point provided by a first plug-in from the identified one or more plug-ins, wherein the at least one extension point provides extension of the functions offered by the first plug-in;

determine at least one second plug-in suitable for the identified at least one extension point of the first plug-in;

based on one or more extension points of the identified one or more plug-ins and a function described in the one or more plug-in manifests, retrieve the identified one or more plug-ins and the at least one second plug-in from a plug-in repository to the client computing device; and link the first plug-in and the at least one second plug-in to generate the requested graphical user interface.

2. The article of manufacture in claim 1, wherein retrieving the identified one or more plug-ins and the at least one second plug-in comprises retrieving the plug-ins according to plug-in identifiers.

3. The article of manufacture in claim 1, wherein generating the requested graphical user interface comprises generating the user interface at flash run time.

4. The article of manufacture in claim 1, wherein generating the requested graphical user interface comprises generating the graphical user interface based on a flash content from the retrieved one or more plug-ins and the at least one second plug-in.

5. A computer system for generating a graphical user interface by using a one or more deployed plug-ins, the computer system comprising:
a processor;
a client computing device to receive a user request to generate the graphical user interface including one or more plugs-ins, the user request comprising a configuration for flash content of the graphical user interface;
a memory in association with the processor storing instructions related to:
a plug-in manager to:
deploy the one or more plug-ins from the one or more content servers,
identify the one or more plug-ins based on one or more plug-in manifests associated with the one or more plug-ins; and
based on the one or more identified plug-ins and a function described in the one or more plug-in manifests, retrieve the deployed plug-ins; and
a plug-in registry to register the deployed one or more plug-ins;
a plug-in repository to store the deployed one or more plug-ins according to plug-in identifiers;
a graphical user interface generator to generate the requested graphical user interface by retrieving one or more plug-ins; and
a user interface to present the generated graphical user interface.

6. The computer system of claim 5, wherein the plug-in registry comprises a function associated with a plug-in from the one or more plug-ins.

7. The computer system of claim 5, wherein the graphical user interface generator generates the graphical user interface based on a combination of the one or more plug-ins.

8. The computer system of claim 5, wherein the user interface is generated at a flash run time.

9. The computer system of claim 5, wherein the graphical user interface generator generates the graphical user interface based on a flash content from the retrieved one or more plug-ins.

10. The computer system of claim 5, wherein a content server in the one or more content servers comprises a just in time configuration creator.

11. The computer system of claim 5, wherein a content server in the one or more content servers comprises an application resource handler.

12. The computer system of claim 5, wherein a content server in the one or more content servers comprises a scope management module.

13. A computerized method for generating graphical user interface by using one or more deployed plug-ins, the computerized method comprising:
receiving a request to generate a graphical user interface including one or more plugs-ins at a client computing device, the request comprising a configuration for flash content of the graphical user interface;
identifying one or more plug-ins based on one or more plug-in manifests associated with the one or more plug-ins, the one or more plug-ins been deployed at a plurality of content servers of a plurality of platform types and stored in a plug-in repository;
identifying at least one extension point provided by a first plug-in from the identified one or more plug-ins, wherein the at least one extension point provides extension of the functions offered by the first plug-in;
determining at least one second plug-in suitable for the identified at least one extension point of the first plug-in;
based on one or more extension points of the identified one or more plug-ins and a function described in the one or more plug-in manifests, retrieving the identified one or more plug-ins and the at least one second plug-in from a plug-in repository to the client computing device; and
linking the first plug-in and the at least one second plug-in to generate the requested graphical user interface.

14. The computerized method of claim 13, wherein retrieving the identified one or more plug-ins and the at least one second plug-in comprises retrieving the plug-ins according to plug-in identifiers.

15. The computerized method of claim 13, wherein the graphical user interface is generated at a flash run time.

16. The computerized method of claim 13, wherein generating the requested graphical user interface comprises generating the graphical user interface based on a flash content from the retrieved one or more plug-ins and the at least one second plug-in.

* * * * *